United States Patent [19]

Bernstein et al.

[11] 4,181,062

[45] Jan. 1, 1980

[54] RELEASE ASSEMBLY USING SEPARATION NUTS AND THRUSTERS

[75] Inventors: Phillip Bernstein, Sunnyvale; Henry Toy, Los Altos, both of Calif.

[73] Assignee: The United States of America as represented by the Secretary of the Navy, Washington, D.C.

[21] Appl. No.: 922,907

[22] Filed: Jul. 10, 1978

[51] Int. Cl.² ............................ F41F 5/02; B64D 1/04
[52] U.S. Cl. ....................................... 89/1.5 F; 89/1 B
[58] Field of Search ................... 89/1.5 F, 1.5 R, 1 B; 244/137 R; 294/83 AE

[56] References Cited

U.S. PATENT DOCUMENTS

| | | | |
|---|---|---|---|
| 3,610,094 | 4/1969 | Craigie | 79/1.5 F |
| 3,883,097 | 5/1975 | Billot | 89/1.5 F X |
| 3,983,783 | 10/1976 | Maxey | 89/1.5 F |
| 4,015,507 | 4/1977 | Toy et al. | 89/1.5 F |
| 4,028,990 | 6/1977 | Waide | 89/1 B |

Primary Examiner—David H. Brown
Attorney, Agent, or Firm—R. S. Sciascia; Charles D. B. Curry; Francis I. Gray

[57] ABSTRACT

A release assembly using separation nuts and thrusters for ejecting a body with spin from a vehicle. The separation nuts are manifolded together in pairs so that failure of one squib of a pair will not affect actuation of the separation nuts, the separation nuts connecting the body to the vehicle. A pair of thrusters is manifolded together so that a single gas cartridge actuates both, the thrusters being situated to impart radial and axial components of velocity to the body upon separation to eject the body with spin from the vehicle. An electrical command energizes the squibs and gas cartridge simultaneously to actuate the separation nuts and thrusters.

2 Claims, 2 Drawing Figures

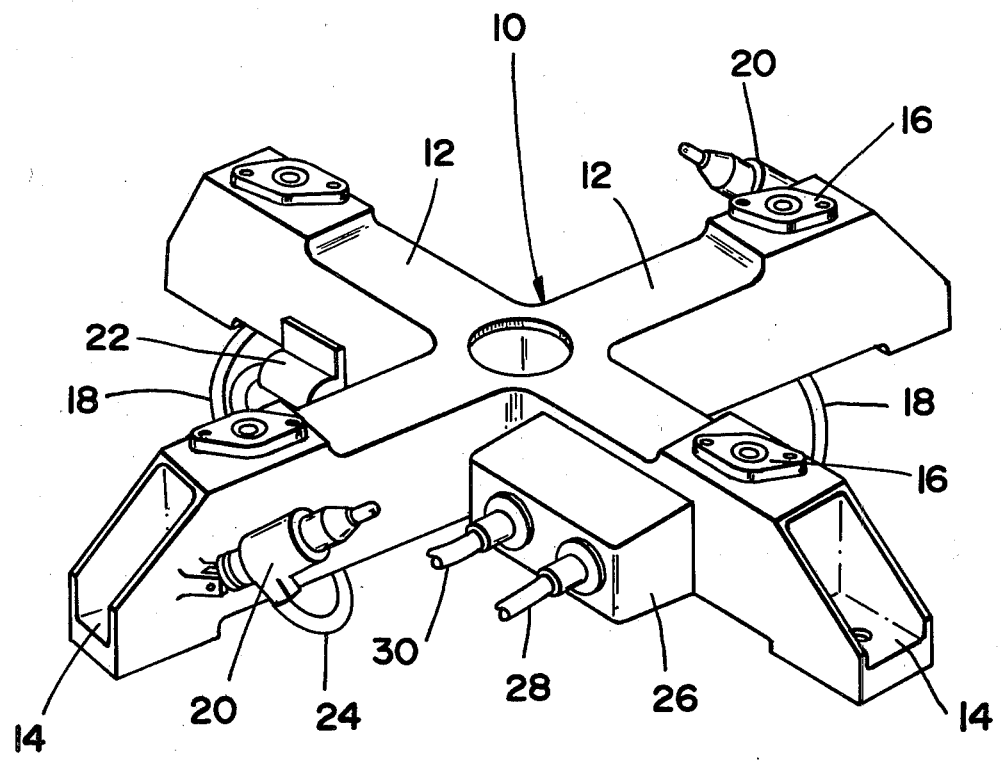
FIG_1

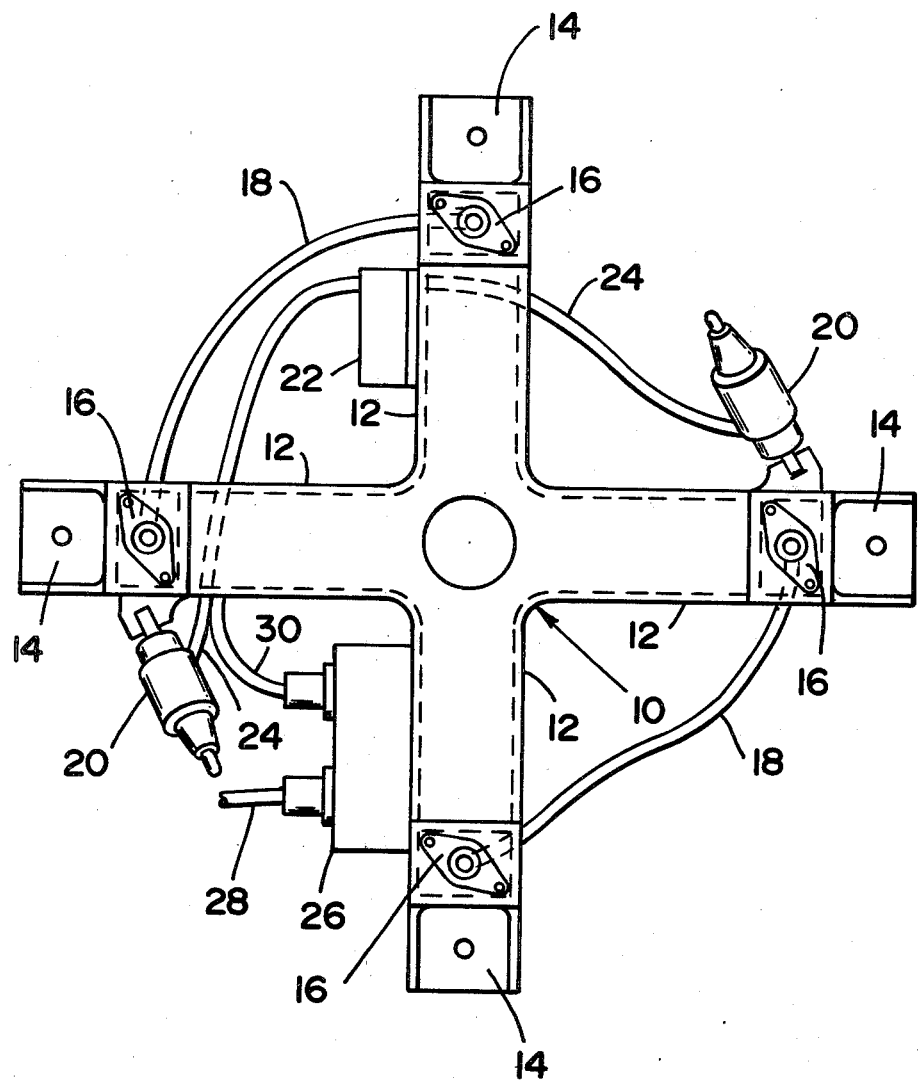
FIG_2

RELEASE ASSEMBLY USING SEPARATION NUTS AND THRUSTERS

BACKGROUND OF THE INVENTION

1. Field of the Invention

The present invention relates to release assemblies, and more particularly to release assemblies using separation nuts and thrusters to eject a body with spin from a vehicle.

2. Description of the Prior Art

Previous methods for releasing a body from a vehicle included the use of frangible joints, frangible bolts, latches, ball-locks, rocket motors and the like. These methods, using individual energy sources, introduced undesired perturbations to the body such as tip off, i.e., the body not being ejected axially from the vehicle. To achieve high accuracy for bodies such as re-entry vehicles from a satellite or missile these perturbations are undesirable.

SUMMARY OF THE INVENTION

Accordingly, the present invention provides a release assembly using separation nuts and thrusters for ejecting a body with spin from a vehicle. The separation nuts connect the body to a cruciform plate which is secured to the vehicle. The separation nuts, having individual energy sources, are manifolded together in pairs so that failure of one energy source of a pair does not prevent actuation of both separation nuts. A pair of thrusters impart rotational and axial components of velocity to the body upon separation from the vehicle to provide spin to the body and eject the body from the vehicle. The thrusters are manifolded together so that a single energy source actuates both thrusters. An electrical impulse energizes all the energy sources simultaneously.

Therefore, it is an object of this invention to provide a release assembly to eject a body with spin from a vehicle.

Other objects, advantages and novel features of the present invention will be apparent from the following detailed description when read in view of the appended claims and attached drawing.

BRIEF DESCRIPTION OF THE DRAWING

FIG. 1 is a perspective view of a release assembly using separation nuts and thrusters.

FIG. 2 is a top plan view of the release assembly of FIG. 1.

DESCRIPTION OF THE PREFERRED EMBODIMENT

Referring now to the Figures a cruciform 10, having arms 12 with an inverted U-shaped cross-section, is permanently secured to a vehicle via bolts or other suitable means through flanges 14 at the ends of the arms. Separation nuts 16, such as those described in co-pending application Ser. No. 833,834, now abandoned, filed Sept. 16, 1977, entitled "A Separation Nut System" by H. Toy, P. Bernstein and J. C. Van der Zwaan, are mounted at the ends of the arms 12 so that corresponding bolts mounted on a body may be secured therein to secure the body to the cruciform 10 and hence to the vehicle. The energy source, such as a squib or the like, for each separation nut 16 is integral with the separation nut and contained with the body of the separation nut within the U-shaped volume of the respective arms 12. A separation nut manifold 18 connects adjacent pairs of separation nuts 16 together so that the failure of the energy source for one separation nut does not affect actuation of that separation nut, the energy source for the second separation nut providing the energization for actuation of both separation nuts.

A pair of thrusters 20, such as are described in U.S. Pat. No. 4,015,507, issued Apr. 15, 1977, entitled "Ejection System" by H. Toy, P. Bernstein and J. C. Van der Zwaan, are mounted at the ends of two opposed arms 12, and are oriented to impart both radial and axial components of velocity to the body upon separation. A single energy source 22, such as a gas generator or the like, is connected via a thruster manifold 24 to both thrusters to actuate both thrusters simultaneously. An electrical sequencer 26 receives a command via input electrical cable 28, and distributes via output electrical cable 30 an electrical pulse to energize all the energy sources simultaneously.

Thus, the present invention provides a release assembly using separation nuts and thrusters for ejecting a body with spin from a vehicle without introducing undesirable perturbations.

What is claimed is:

1. A body release assembly using separation nuts and thrusters comprising:
   (a) a plurality of pairs of separation nuts, each of said pairs of separation nuts having individual energy sources and being manifolded together so that in the event of a failure of the energy source for one of said separation nuts the energy source for the other of said separation nuts will actuate both separation nuts;
   (b) a pair of thrusters manifolded together such that a single energy source actuates both of said thrusters; and
   (c) means for simultaneously energizing said separation nut energy sources and said thruster single energy source;
   whereby a body connected to a vehicle by said separation nuts is released, having spin and a velocity component imparted by said thrusters.

2. A method for separating a body from a vehicle comprising the steps of:
   (a) actuating a plurality of pairs of separation nuts upon a command, and pairs of separation nuts being manifolded together to provide actuation of both separation nuts of each pair by an energy source, to separate said body from said vehicle; and
   (b) thrusting said body with a pair of thrusters simultaneous with said command, said thrusters being manifolded together to use one energy source, to impart spin and a velocity increment to said body.

* * * * *